US010649317B2

(12) United States Patent
Thomas et al.

(10) Patent No.: US 10,649,317 B2
(45) Date of Patent: May 12, 2020

(54) IMAGING SYSTEM AND METHOD OF CREATING IMAGES

(71) Applicant: Battelle Memorial Institute, Columbus, OH (US)

(72) Inventors: Brad A. Thomas, Circleville, OH (US); Matthew P. Rubal, Columbus, OH (US)

(73) Assignee: Batelle Memorial Institute, Columbus, OH (US)

( * ) Notice: Subject to any disclaimer, the term of this patent is extended or adjusted under 35 U.S.C. 154(b) by 21 days.

(21) Appl. No.: 15/560,399

(22) PCT Filed: Mar. 1, 2016

(86) PCT No.: PCT/US2016/020219
§ 371 (c)(1),
(2) Date: Sep. 21, 2017

(87) PCT Pub. No.: WO2016/153743
PCT Pub. Date: Sep. 29, 2016

(65) Prior Publication Data
US 2018/0067380 A1   Mar. 8, 2018

Related U.S. Application Data

(60) Provisional application No. 62/137,500, filed on Mar. 24, 2015.

(51) Int. Cl.
*H04N 5/225* (2006.01)
*G03B 17/08* (2006.01)
(Continued)

(52) U.S. Cl.
CPC ............. *G03B 17/08* (2013.01); *G03B 17/17* (2013.01); *G03B 37/06* (2013.01); *H04N 5/2251* (2013.01)

(58) Field of Classification Search
CPC ................................ G02B 23/22; G03B 17/08
(Continued)

(56) References Cited

U.S. PATENT DOCUMENTS 4,168,897 A  *  9/1979  Gates ..................... G03B 17/14
                                                                            396/25
4,811,039 A     3/1989  Maeno et al.
(Continued)

FOREIGN PATENT DOCUMENTS

JP          2000299805         10/2000

*Primary Examiner* — Twyler L Haskins
*Assistant Examiner* — Dwight Alex C Tejano
(74) *Attorney, Agent, or Firm* — Diederiks & Whitelaw, PLC.

(57) ABSTRACT

An imaging system includes a spherical window, a reflector, an image sensor, a housing and a snap ring. The reflector has a focus point located at a center of a sphere defined by an outer surface of the window. Light entering the window at an angle perpendicular to the outer surface of the window and traveling to the focus point is reflected onto the image sensor by the reflector. The window and housing have first and second grooves, respectively. In order to couple the window to the housing, the snap ring is placed in the second groove, the snap ring is compressed with the window and then the snap ring is allowed to expand so that the snap ring is located in both the first and second grooves.

19 Claims, 2 Drawing Sheets

(51) Int. Cl.
*G03B 17/17* (2006.01)
*G03B 37/06* (2006.01)

(58) Field of Classification Search
USPC .......................................................... 348/81
See application file for complete search history.

(56) References Cited

U.S. PATENT DOCUMENTS

| | | | |
|---|---|---|---|
| 6,088,531 A | 7/2000 | Endoh | |
| 6,118,474 A | 9/2000 | Nayar | |
| 6,313,865 B1* | 11/2001 | Driscoll, Jr. | H04N 13/239 348/36 |
| 7,627,235 B2 | 12/2009 | McCutchen et al. | |
| 8,559,801 B2 | 10/2013 | Dimotakis | |
| 9,568,807 B2 | 2/2017 | Aldred et al. | |
| 2001/0022627 A1* | 9/2001 | Bernhardt | G08B 13/19619 348/373 |
| 2003/0071891 A1* | 4/2003 | Geng | H04N 5/2259 348/39 |
| 2005/0024493 A1* | 2/2005 | Nam | G08B 13/19619 348/143 |
| 2010/0194914 A1* | 8/2010 | Jones | H04N 5/2252 348/222.1 |
| 2014/0313359 A1* | 10/2014 | Hwang | H04N 5/23238 348/218.1 |
| 2015/0125661 A1* | 5/2015 | Sullivan | C23C 4/18 428/156 |
| 2015/0138336 A1* | 5/2015 | Ueno | H04N 5/2252 348/81 |
| 2015/0153289 A1* | 6/2015 | Kim | H04N 5/225 348/81 |

\* cited by examiner

IMAGING SYSTEM AND METHOD OF CREATING IMAGES

CROSS-REFERENCE TO RELATED APPLICATIONS

This application represents the U.S. National Phase of International Application No. PCT/US2016/020219 entitled "Imaging System and Method of Creating Images" filed 1 Mar. 2016, which claims the benefit of U.S. Provisional Patent Application Ser. No. 62/137,500, which was filed on Mar. 24, 2015 and titled "Imaging System and Method of Creating Images". The entire content of these applications are incorporated by reference.

BACKGROUND OF THE INVENTION

The present invention pertains to imaging systems and, more particularly, to an imaging system having a 360-degree field of view (FOV).

In certain applications, it is desirable for an imaging system to have a large (FOV) in order to provide as much information as possible about the surroundings of the imaging system. For example, underwater remotely operated vehicles (ROVs) are used to accomplish underwater tasks in a variety of fields. The difficulty of these tasks is increased due to the fact that the operator is situated at a remote location, thereby limiting the operator's awareness of the ROV's surroundings. Accordingly, ROVs typically include one or more cameras. When a single camera is used, the camera pans and tilts to show different areas around the ROV. However, this still provides only a relatively small FOV at any given instant and either: 1) requires that the ROV be piloted at the same time the camera is adjusted; or 2) introduces a delay in which piloting ceases while the camera is adjusted. Using multiple cameras increases the cost and complexity of the system. Also, regardless of whether a single camera is used or multiple cameras are used, the camera arrangement may not provide a single, panoramic view, thereby requiring increased effort on the part of the operator to assess the ROV's surroundings.

Furthermore, for an underwater imaging system, the transition between air and water causes issues due to refraction. As is known in the art, refraction is the change in direction of propagation of a wave (e.g., light) due to a change in its transmission medium (e.g., air or water). When light moves between two transmission media, the light is bent, which causes distortion in a scene that includes multiple transmission media (and, hence, in an image generated from the scene). Additionally, when an imaging system is used underwater, it is important that the components of the system be protected from water. Therefore, the imaging system usually includes a transparent window that at least partially encloses the system's components. It is desirable that such a window be securely coupled to the rest of the system, provide a watertight seal and not obstruct the imaging system's FOV.

Accordingly, there is a need in the art for an imaging system that provides a large FOV, eliminates problems due to refraction and includes a window having the desired properties.

SUMMARY OF THE INVENTION

The present invention is directed to an imaging system. In one embodiment, the imaging system includes a spherical window, a reflector and an image sensor. The reflector has a focus point located at a center of a sphere defined by an outer surface of the window. Light entering the window at an angle perpendicular to the outer surface of the window and traveling to the focus is reflected onto the image sensor by the reflector. Light entering the window at an angle not perpendicular to the outer surface of the window is not reflected onto the image sensor by the reflector. Preferably, the reflector is a paraboloidal reflector.

In another embodiment, the window is a pressure window, and the focus point is located at a center of a sphere defined by an inner surface of the window. In still another embodiment, the imaging system further includes a housing configured to receive and support the image sensor. Transparent supports are coupled to the housing, and a base plate is supported by the transparent supports. The reflector is coupled to the base plate.

In yet another embodiment, the imaging system includes a window, an image sensor configured to receive light entering the window, a housing and a snap ring. The window and housing have first and second grooves, respectively. In order to couple the window to the housing, the snap ring is placed in the second groove, the snap ring is compressed using the window and then the snap ring is allowed to expand so that the snap ring is located in both the first and second grooves. Preferably, the window includes a chamfer configured to contact the snap ring during coupling of the window to the housing.

In a further embodiment, the housing includes a third groove, and the imaging system includes a seal located in the third groove. The seal is configured to prevent leaks between the window and the housing. In a still further embodiment, the imaging system includes a reflector having a focus point. Light entering the window and traveling to the focus point is reflected onto the image sensor by the reflector. The first and second grooves are located out of line-of-sight of the focus point such that the field of view of the imaging system is not obstructed by the first and second grooves or the snap ring.

Additional objects, features and advantages of the present invention will become more readily apparent from the following detail description of preferred embodiments when taken in conjunction with the drawings wherein like reference numerals refer to corresponding parts in the several views.

DETAILED DESCRIPTION OF THE PREFERRED EMBODIMENTS

Detailed embodiments of the present invention are disclosed herein. However, it is to be understood that the disclosed embodiments are merely exemplary of the invention that may be embodied in various and alternative forms. The figures are not necessarily to scale, and some features may be exaggerated or minimized to show details of particular components. Therefore, specific structural and functional details disclosed herein are not to be interpreted as limiting but merely as a representative basis for teaching one skilled in the art to variously employ the present invention. Additionally, as used in connection with the present invention, terms such as "parallel", "perpendicular", "paraboloidal", "spherical" and "center" do not necessarily require, for example, that the relevant item be geometrically exact, e.g., perfectly spherical. Instead, these terms contemplate a margin of error of +/−3% (regardless of whether the error is by design or due to inherent manufacturing limitations) so long as the error does not prevent the present invention from functioning as intended. The modifier "substantially" increases the margin of error to +/−5%, while the modifier "generally" increases the margin to +/−10%. The same principles also apply when the value of a property is specified (i.e., a length of 1 m or a pressure of 200 kPa includes a margin of error of +/−3%). Furthermore, as will become clear, a spherical window in accordance with the present invention need not be a full sphere. However, the window is preferably at least a hemisphere. More preferably, the window defines at least 75% of a sphere.

Figure 1:
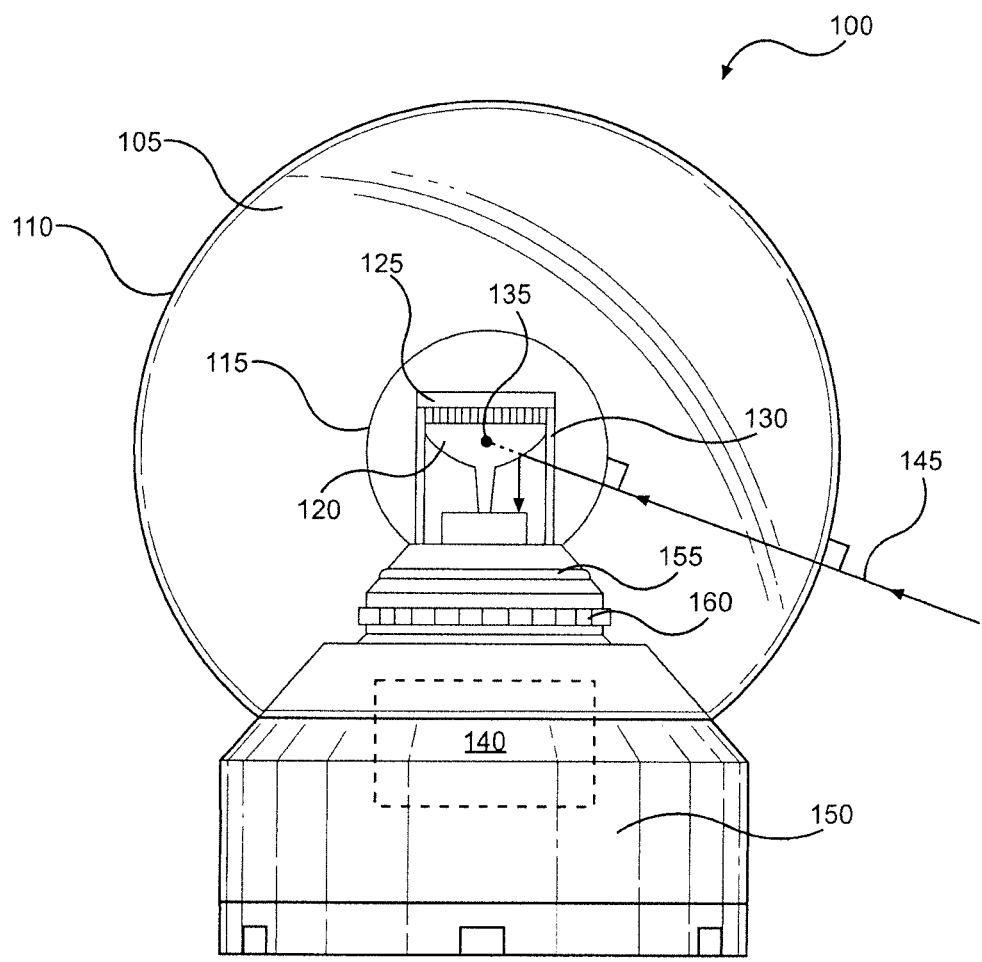
FIG. 1 is a perspective view of an imaging system constructed in accordance with the present invention.

With initial reference to FIG. 1, there is illustrated an imaging system 100 constructed in accordance with the present invention. System 100 includes a spherical pressure window 105 having an outer surface 110 and an inner surface 115, with outer and inner surfaces 110, 115 defining concentric spheres. The portion of window 105 between outer surface 110 and inner surface 115 is solid in order to strengthen window 105. Accordingly, window 105 can preferably withstand great pressures, such as those found at depth within a body of water. For the purposes of the present invention, a "pressure window" is defined as a window that is configured to withstand pressures encountered in deep sea exploration, including depths of at least 4500 m. This allows system 100 to be used with an ROV, for example. However, system 100 can of course be used in a wide variety of applications. When system 100 is to be used in an application where the pressure on window 105 would be relatively low, window 105 can be replaced with a thinner "non-pressure" window.

A paraboloidal reflector 120 is located within window 105 and, more specifically, within the sphere defined by inner surface 115. Reflector 120 is coupled to a base plate 125, which is supported by transparent supports (one of which is labeled 130). Light that would otherwise pass through a focus point 135 of reflector 120 is reflected by reflector 120 to an image sensor 140. A signal is then sent from image sensor 140 to a computer or, more generally, a control system (not shown). The end result is that a user is able to view a 360-degree scene of the area around system 100. This portion of system 100 is based on U.S. Pat. No. 6,118,474, titled "Omnidirectional Imaging Apparatus", which is hereby incorporated by reference. Accordingly, the structure and function of these components will not be discussed in great detail.

Although the inventions of U.S. Pat. No. 6,118,474 provide an image of a hemispherical scene, they do not eliminate the distortion caused by refraction during a transition of system 100 from one transmission medium to another (e.g., from air to water or vice versa). This distortion is caused by the change in refractive properties at the window interface (i.e., at outer surface 110). Specifically, each of air, water and window 105 has a different refractive index. As a result, light passing from one of these transmission media to another is bent (i.e., it changes angles). Since and air water have different refractive indexes, light passing from air to window 105 is bent to a different degree than light passing from water to window 105. This difference in bending is what causes the aforementioned distortion. However, light that passes from one transmission media to another at an angle perpendicular to the plane of the transition is not bent but only slowed. This means that light entering window 105 at an angle perpendicular to outer surface 110 is not bent. Therefore, if only these perpendicular light rays are used to create an image, the image will not be distorted. In order to accomplish this, focus point 135 of reflector 120 is placed at the center of both the sphere defined by outer surface 110 and the sphere defined by inner surface 115 (which is the same location since these spheres are concentric). The fact that the spheres are concentric also means that light entering window 105 at an angle perpendicular to outer surface 110 also exits window 105 at an angle perpendicular to inner surface 115. This prevents bending of the light at the transition between window 105 and the air within the sphere defined by inner surface 115. Due to the configuration of reflector 120, only light entering window 105 at an angle perpendicular to outer surface 110, exiting window 105 at an angle perpendicular to inner surface 115 and traveling towards focus point 135 is reflected to image sensor 140, thereby eliminating distortion in an image created using image sensor 140. A ray 145 illustrates one such path.

Figure 2:
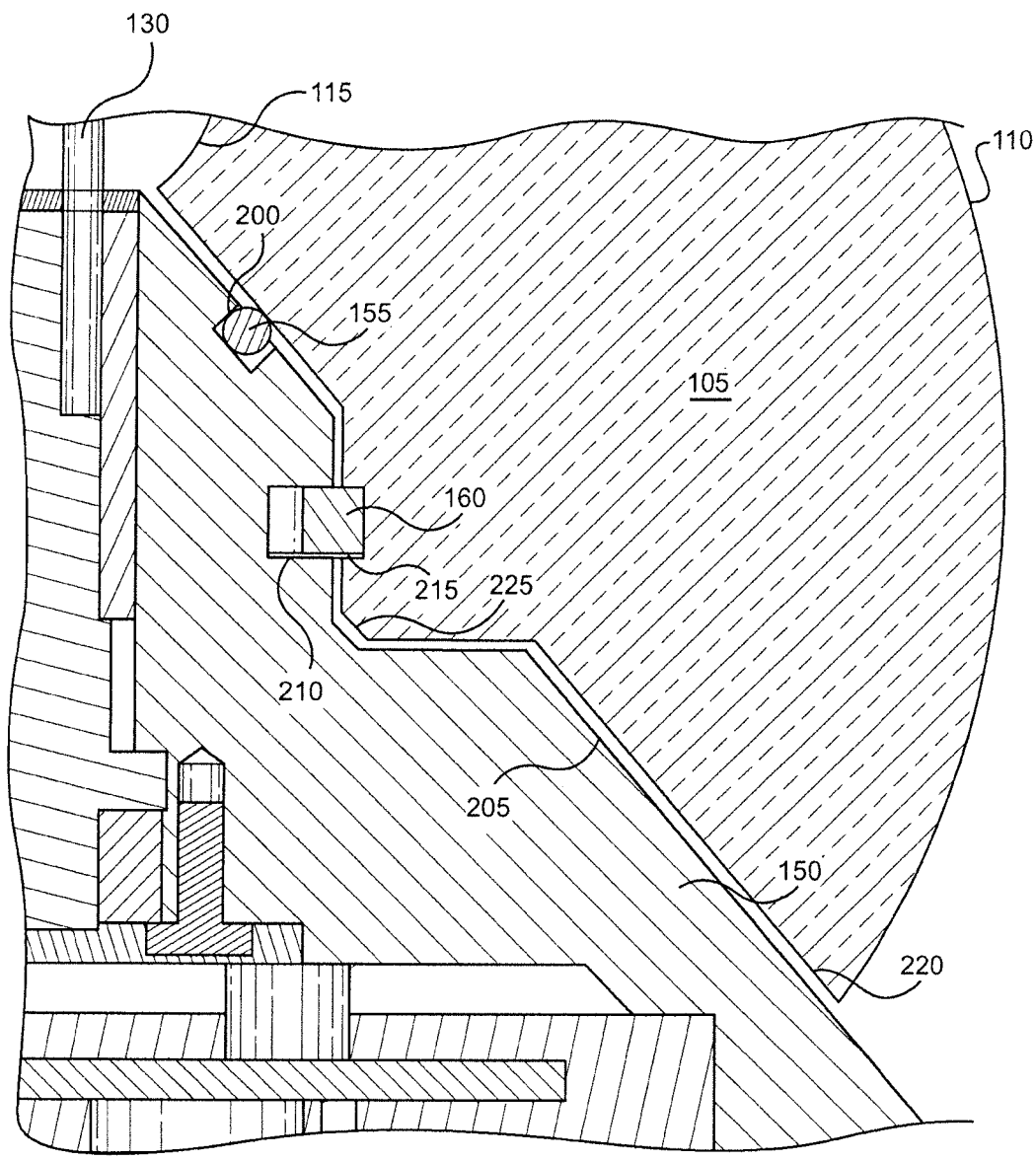
FIG. 2 is a cross section of a portion of the imaging system showing a coupling arrangement of a window to a housing.

Window 105 is coupled to a housing 150, which is coupled, in turn, to an ROV or other structure (not shown). Housing 150 also receives and supports image sensor 140. A seal 155 is provided between window 105 and housing 150 to prevent leaks, and a snap ring 160 is used to secure window 105 in place. With reference now to FIG. 2, seal 155 is located in a groove 200 formed in an outer surface 205 housing 150. Similarly, snap ring 160 is located partially in a groove 210, formed in outer surface 205, and partially in a groove 215, formed in an inner surface 220 of window 105, when snap ring 160 is in an installed position (i.e., when window 105 is coupled to housing 150). During installation, snap ring 160 is placed in groove 210 and window 105 is lowered over reflector 120 (and the other nearby structure) until a chamfer 225 of window 105 contacts snap ring 160. At this point, further movement of window 105 compresses snap ring 160. Once grooves 210 and 215 are aligned, snap ring 160 expands such that snap ring 160 is simultaneously located in both groove 210 and groove 215. As a result, the design combines the function of a retaining ring with the ease of a snap ring and results in window 105 being securely coupled to housing 150 without any residual stress left in window 105. Advantageously, this arrangement also results in proper alignment of window 150 relative to reflector 120 due to the contact between outer surface 205 and inner surface 220. In addition, since grooves 210 and 215 are located out of line-of-sight of focus point 135, the FOV of system 100 is not obstructed by this coupling arrangement. In order to provide for disassembly, chamfers can optionally be added to snap ring 160 and the portion of window 105 just below groove 215, enabling window 105 to compress snap ring 160. However, care should be taken that the force required to remove window 105 is greater than the loads typically imparted during operation, shipping and handling of system 100.

Based on the above, it should be readily apparent that the present invention provides an imaging system that has a large FOV, eliminates problems due to refraction and includes a window that is securely coupled to the rest of the system, provides a watertight seal and does not obstruct the system's FOV. Although described with reference to preferred embodiments, it should be readily understood that various changes or modifications could be made to the invention without departing from the spirit thereof. For example, although the present invention has been discussed in connection with an ROV, the present invention can be used in a wide variety of applications.

The invention claimed is:

1. An imaging system comprising:
a spherical window, wherein the window is a pressure window;
a reflector including a focus point located at a center of a sphere defined by an outer surface of the window; and
an image sensor, wherein light entering the window at an angle perpendicular to the outer surface of the window and traveling to the focus point is reflected onto the image sensor by the reflector, and the reflector is configured so that light entering the window, at different points, at an angle perpendicular to the outer surface of the window is reflected onto the image sensor by the reflector.

2. The imaging system of claim 1, wherein the reflector is configured so that light entering the window at an angle not perpendicular to the outer surface of the window is not reflected onto the image sensor by the reflector.

3. The imaging system of claim 2, wherein the reflector is a paraboloidal reflector.

4. The imaging system of claim 2, further comprising:
a housing configured to receive and support the image sensor;
transparent supports coupled to the housing; and
a base plate supported by the transparent supports, the reflector being coupled to the base plate.

5. The imaging system of claim 1, wherein the focus point is located at a center of a sphere defined by an inner surface of the window.

6. The imaging system of claim 1, wherein the reflector is configured to eliminate distortion in an image created by the image sensor.

7. An imaging system comprising:
a window including a first groove;
an image sensor configured to receive light entering the window;
a housing including a second groove; and
a snap ring, wherein, when the window is coupled to the housing, the snap ring is located in both the first and second grooves.

8. The imaging system of claim 7, wherein the window includes a chamfer configured to contact the snap ring during coupling of the window to the housing.

9. The imaging system of claim 7, wherein the housing further includes a third groove, the imaging system further comprising a seal located in the third groove, the seal being configured to prevent leaks between the window and the housing.

10. The imaging system of claim 7, further comprising:
a reflector including a focus point, wherein light entering the window and traveling to the focus point is reflected onto the image sensor by the reflector, and wherein the first and second grooves are located out of line-of-sight of the focus point such that the field of view of the imaging system is not obstructed by the first and second grooves or the snap ring.

11. The imaging system of claim 7, wherein each of the first and second grooves is formed with sidewalls and a bottom wall.

12. A method of creating images with an imaging system including a spherical window, a housing coupled to the window, a reflector having a focus point located at a center of a sphere defined by an outer surface of the window and an image sensor, the method comprising:
reflecting light entering the window at different points at an angle perpendicular to the outer surface of the window and traveling to the focus point onto the image sensor using the reflector; and
preventing leaks between the window and the housing using a seal.

13. The method of claim 12, wherein light entering the window at an angle not perpendicular to the outer surface of the window is not reflected onto the image sensor by the reflector.

14. The method of claim 13, wherein reflecting light onto the image sensor using the reflector includes reflecting light onto the image sensor using a paraboloidal reflector.

15. The method of claim 12, wherein the housing includes a groove, the method further comprising:
placing the seal in the groove.

16. A method of assembling an imaging system including a window having a first groove, an image sensor configured to receive light entering the window, a housing having a second groove and a snap ring, the method comprising:
placing the snap ring in the second groove;
compressing the snap ring using the window; and
allowing the snap ring to expand so that the snap ring is located in both the first and second grooves.

17. The method of claim 16, wherein:
the window includes a chamfer; and
compressing the snap ring using the window includes compressing the snap ring with the chamfer.

18. The method of claim 16, wherein the imaging system further includes a housing coupled to the window, the method further comprising:
preventing leaks between the window and the housing using a seal.

19. The method of claim 18, wherein the housing includes a groove, the method further comprising:
placing the seal in the groove.

* * * * *